(12) United States Patent
Fondelli et al.

(10) Patent No.: US 9,071,500 B2
(45) Date of Patent: Jun. 30, 2015

(54) OWNERSHIP TRANSFER OF A LABEL SWITCHED PATH

(75) Inventors: Francesco Fondelli, Calcinaia (IT); Diego Caviglia, Savona (IT); Daniele Ceccarelli, Genoa (IT)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 461 days.

(21) Appl. No.: 13/375,203

(22) PCT Filed: May 29, 2009

(86) PCT No.: PCT/EP2009/056681
§ 371 (c)(1),
(2), (4) Date: Mar. 7, 2012

(87) PCT Pub. No.: WO2010/136074
PCT Pub. Date: Dec. 2, 2010

(65) Prior Publication Data
US 2012/0155327 A1   Jun. 21, 2012

(51) Int. Cl.
*H04L 12/24* (2006.01)
*H04L 12/701* (2013.01)
*H04L 12/723* (2013.01)

(52) U.S. Cl.
CPC .............. *H04L 45/00* (2013.01); *H04L 41/0213* (2013.01); *H04L 41/0816* (2013.01); *H04L 45/50* (2013.01)

(58) Field of Classification Search
CPC ............ H04L 41/0213; H04L 41/0813; H04L 41/0816; H04L 41/082; H04L 45/50; H04L 45/502; H04L 45/505; H04L 45/507
USPC ............................................ 370/395.1–395.6
See application file for complete search history.

(56) References Cited

U.S. PATENT DOCUMENTS

2006/0268944 A1 * 11/2006 Xu .............................. 370/903
2009/0083438 A1    3/2009 Matsumoto et al.

OTHER PUBLICATIONS

C. Srinivasan et al., "Multiprotocol Label Switching (MPLS) Traffic Engineering (TE) Management Information Base (MIB)", Jun. 2004, 68 pages, Network Working Group, Request for Comments 3812, The Internet Society.
C. Srinivasan et al., "Multiprotocol Label Switching (MPLS) Label Switching Router (LSR) Management Information Base (MIB)", Jun. 2004, 60 pages, Network Working Group, Request for Comments 3813, The Internet Society.

(Continued)

*Primary Examiner* — Pao Sinkantarakorn
(74) *Attorney, Agent, or Firm* — Nicholson De Vos Webster & Elliott LLP (57) ABSTRACT

Control of a label switched path established in a network is transferred between a management plane and a control plane of the network. A node (e.g., node C) receives a message indicating a change in control of the label switched path, the message identifying the label switched path by a cross-connection identifier corresponding to an entry in the control data stored at the node which identifies data plane ingress and egress segments cross-connected at the node. Control data at the node is updated based on the identified label switched path. The message includes a list of cross-connection identifiers for nodes (e.g., nodes C, E, and F) along the label switched path. The cross-connection identifier can be an mplsXCIndex.

13 Claims, 8 Drawing Sheets (56) References Cited

OTHER PUBLICATIONS

D. Caviglia et al., "RSVP-TE Signaling Extension for the Conversion Between Permanent Connections and Soft Permanent Connections in a GMPLS Enabled Transport Network", Oct. 28, 2008, 23 pages, CCAMP Working Group, Internet-Draft, The IETF Trust.

International Search Report, Application No. PCT/EP2009/056681, dated Jan. 26, 2010, 3 pages.

Written Opinion of the International Searching Authority for PCT Application No. PCT/EP2009/056681, dated Jan. 26, 2010; 7 pages.

Rosen, E. et al., "Multiprotocol Label Switching Architecture," RFC 3031; Internet Society; Network Working Group; Jan. 2001; 61 pages.

Mannie, E., "Generalized Multi-Protocol Label Switching (GMPLS) architecture," RFC 3945; IETF, Oct. 2004; 69 pages.

Braden, R., et al., "Resource ReSerVation Protocol (RSVP)—Version 1 Functional Specification," Network Working Group, RFC 2205; Sep. 2007; 112 pages.

Awduche, D. et al., "RSVP-TE: Extensions to RSVP for LSP Tunnels," Network Working Group; RFC 3209; Dec. 2001; 61 pages.

Berger, L., "Generalized Multi-Protocol Label Switching (GMPLS) Signaling Functional Description," Network Working Group; RFC 3471; Jan. 2003; 34 pages.

Berger, L., "Generalized Multi-Protocol Label Switching (GMPLS) Signaling Resource ReserVation Protocol-Traffic Engineering (RSVP-TE)," Network Working Group; RFC 3473; Jan. 2003; 42 pages.

Farrel, A., et al., "Encoding of Attributes for Multiprotocol Label Switching (MPLS) Label Switched Path (LSP) Establishment Using Resource ReserVation Protocol-Traffic Engineering (RSVP-TE)," Network Working Group; RFC 4420; Feb. 2006; 21 pages.

PCT International Preliminary Report on Patentability of the International Searching Authority for PCT Application No. PCT/EP2009/056681, dated Nov. 29, 2011; 8 pages.

\* cited by examiner

OWNERSHIP TRANSFER OF A LABEL SWITCHED PATH

CROSS-REFERENCE TO RELATED APPLICATIONS

This application is a National stage of International Application No. PCT/EP2009/056681, filed May 29, 2009, which is hereby incorporated by reference.

TECHNICAL FIELD

This invention relates to managing label switched paths in a communications network.

BACKGROUND

Multi-Protocol Label Switching (MPLS) and Generalised Multi-Protocol Label Switching (GMPLS) are known connection-oriented technologies in which label switched paths (LSP) are established across a network. At each network node along the label switched path a Label Switching Router (LSR) makes a forwarding decision by a simple inspection of a label carried within the header of a received transport unit (e.g. packet).

Label-switched paths can be created by a Network Management System (NMS). The NMS directly instructs each node along a path to implement a required forwarding behaviour. This is the management plane and LSPs created in this way are called Permanent Connections (PC). Label-switched paths can also be created by end-to-end network signalling in an automatic manner. This is the Control Plane and LSPs created in this way are called Soft Permanent Connections (SPC). Both kinds of connections (PC, SPC) can independently coexist within the same network.

An IETF draft "RSVP-TE signalling Extension for the Conversion Between Permanent Connections and Soft Permanent Connections in a GMPLS Enabled Transport Network", 28 Oct. 2008, describes a process which allows the transfer of ownership of LSPs. That is, a LSP created by the management plane (MP) can be transferred to the Control Plane (CP), or vice versa. Ideally, the transfer of ownership (also called "adoption" or "handover") should be performed without affecting Data Plane traffic being carried over the LSP.

The draft specified above gives an overview of signalling to perform the transfer of ownership, and suggests modifying the existing Resource Reservation Protocol-Traffic Engineering (RSVP-TE) message to carry an additional flag indicating that ownership is being transferred.

SUMMARY

A first aspect of the invention provides a method of configuring a change in control of a label switched path established at a node of a network, the change in control being between a management plane and a control plane of the network, the node storing control data, the method comprising at the node:

receiving a message indicating a change in control of the label switched path, the message identifying the label switched path by a cross-connection identifier corresponding to an entry in the control data stored at the node which identifies data plane ingress and egress segments cross-connected at the node;

updating control data at the node based on the identified label switched path.

The signalling message includes information which identifies the particular label switched path (LSP) at the node level. It is not mandatory for a node to store network level information about a LSP if the LSP has been created by the management plane. Therefore, identifying the LSP at the node level ensures a reliable transfer of ownership irrespective of whether a node stores network level information about established LSPs. The cross-connection identifier is a particularly advantageous identifier as it defines forwarding behaviour at the data plane and therefore is always stored at a node. Also, the cross-connection identifier is a single field which uniquely identifies a LSP, and therefore minimises the amount of data that needs to be signalled along the path for LSP identification purposes.

A further aspect of the invention provides a method of configuring a change in control of a label switched path established between nodes of a network between a head node and a tail node, the change in control being between a management plane and a control plane of the network, nodes along the path storing control data, the method comprising at the head node:

receiving a first message requesting a change in control of the label switched path, the message including a plurality of cross-connection identifiers;

generating a second message indicating a change in control of the label switched path, the message identifying the label switched path by a plurality of cross-connection identifiers, each cross-connection identifier corresponding to an entry in the control data stored at a node along the path which identifies data plane ingress and egress segments cross-connected at the node;

sending the second message to another node along the label switched path.

A further aspect of the invention provides a method of configuring a change in control of a label switched path established at a node of a network, the change in control being between a control plane and a management plane of the network, the node storing control data comprising a first management information base which is used by the data plane and a second management information base which is used by the control plane, the method comprising at the node:

receiving a message indicating a change in control of the label switched path, the message identifying the label switched path using information which corresponds to an entry in the second management information base;

using the entry in the second management information base to retrieve an entry in the first management information base, the entry in the first management information base comprising a cross-connection identifier which identifies data plane ingress and egress segments cross-connected at the node;

updating control data at the node based on the identified label switched path.

Further aspects of the invention provide apparatus for implementing any of the described methods.

The functionality described here can be implemented in software, hardware or a combination of these. The functionality can be implemented by means of hardware comprising several distinct elements and by means of a suitably programmed processing apparatus. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other non-transitory machine-readable storage medium. The machine-readable instructions can be downloaded to a processing apparatus via a network connection.

BRIEF DESCRIPTION OF THE DRAWINGS

Embodiments of the invention will be described, by way of example only, with reference to the accompanying drawings in which.

DETAILED DESCRIPTION

Figure 1:
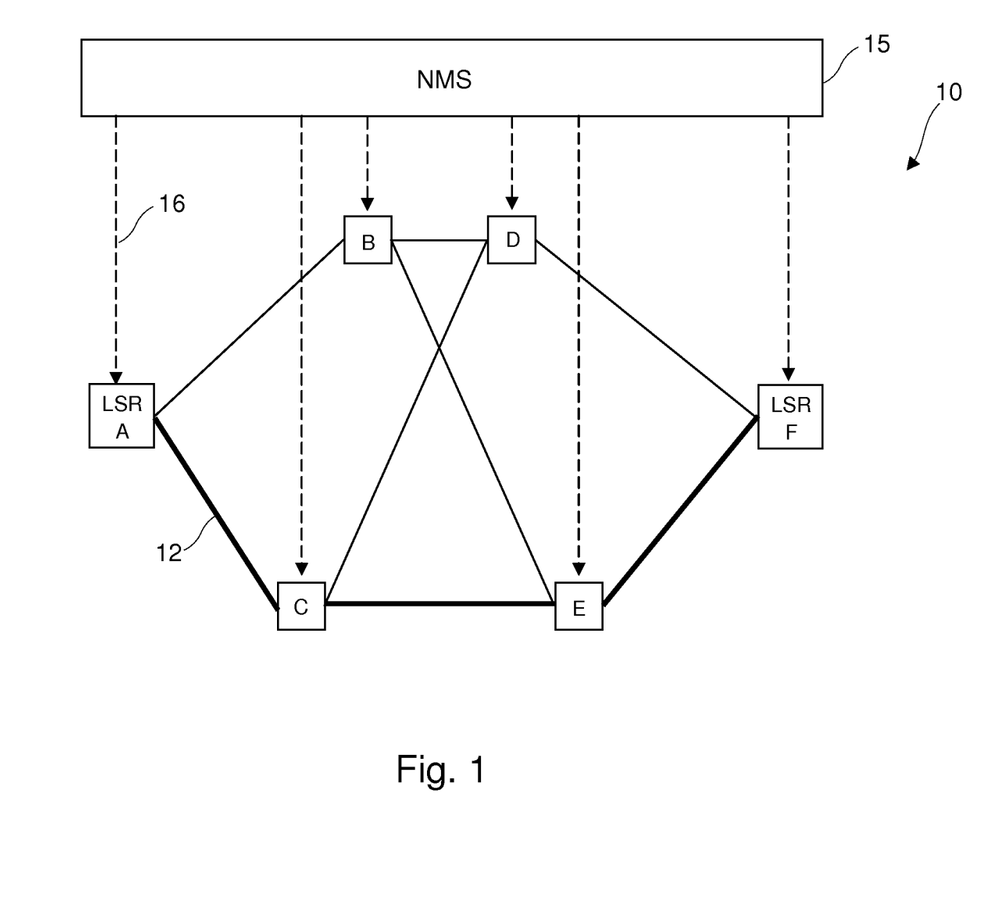
FIG. 1 shows an example network of nodes and a Label Switched Path (LSP)

FIG. 1 shows an example network of nodes A-F which form a Generalised Multi Protocol Label Switched (GMPLS) network or a Multi Protocol Label Switched (MPLS) network 10. The MPLS architecture is described in RFC 3031 and the GMPLS architecture is described in RFC 3945. Nodes A-F are Label Switching Routers (LSR). Label switched paths (LSP) are established in the network, each LSP having a determined route. A LSP can be uni-directional or bi-directional. One such LSP 12 is shown in FIG. 1 which follows a routing via nodes A-C-E-F. As is known, GMPLS and MPLS are not tied to any particular Layer 2 and Layer 3 technology.

Label-switched paths can be created by the Network Management System (NMS) 15, with the NMS 15 directly instructing 16 each node along a path to implement a required forwarding behaviour. This is called the management plane and LSPs created in this way are called Permanent Connections (PC). Label-switched paths can also be created by end-to-end network signalling in an automatic manner. This is typically called the Control Plane and LSPs created in this way are called Soft Permanent Connections (SPC). Both kinds of connections (PC, SPC) can independently coexist within the same network 10.

Figure 2:
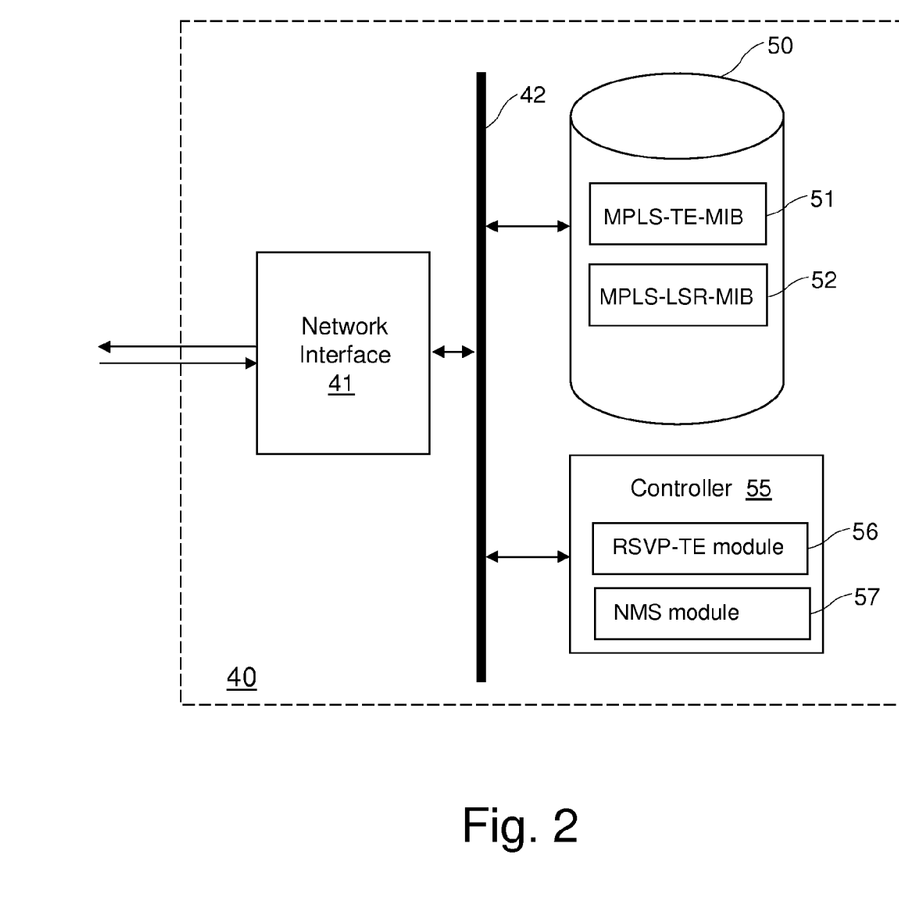
FIG. 2 shows a Label Switching Router (LSR) at a node of FIG. 1.

FIG. 2 schematically shows a LSR 40 at a network node. The LSR 40 has a network interface 41 for receiving transport units (e.g. packets or frames of data) from other LSRs. Network interface 41 can also receive signalling messages from NMS 15. A system bus 42 connects the network interface 41 to storage 50 and a controller 55. Storage 50 provides a temporary storage function for received transport units (e.g. packets) before they are forwarded. Storage 50 also stores control data which controls the forwarding behaviour of the LSR 40. In IETF terminology, control data is stored in Management Information Bases (MIB). Each MIB comprises tables used to describe objects. A table comprises entries. Each entry in the table is identified by a set of keys. Two MIBs are particularly relevant to this invention: an MPLS Traffic Engineering MIB (MPLS-TE-MIB) 51 stores control data which is generally related to the Control Plane and an MPLS Label Switching Router MIB (MPLS-LSR-MIB) 52 stores control data which is generally related to the Data Plane. MPLS-TE-MIB is described in RFC 3812 and MPLS-LSR-MIB is described in RFC 3813. The MPLS-LSR-MIB is used to describe cross-connections on a node; these cross-connections are identified at node level by the mplsXCIndex (i.e. a table entry key). An LSP comprises a set of cross-connections, one for each node along the path.

Controller 55 controls, and performs, the forwarding functions of the LSR 40. Controller 55 also includes signalling modules 56, 57 which interact with other network entities. An RSVP-TE module 56 performs RSVP-TE signalling. RSVP-TE is one of the protocols used to establish and tear down an LSP. An NMS module 57 performs signalling with the NMS 15. Although a single storage entity 50 is shown in FIG. 2, it will be appreciated that multiple storage entities can be provided for storing different types of data. Similarly, although a single controller 55 is shown, it will be appreciated that multiple controllers can be provided for performing the various control functions. For example, forwarding of transport units (e.g. packets) can be performed by a dedicated high-performance processor while other functions can be performed by a separate processor. The described functions can be performed by a general purpose processor which executes software to cause the processor to perform the required functions.

An LSP is a network concept and can be uniquely identified on a network basis by the quintuple-key:
Tunnel endpoint (egress) address
Tunnel ID
Extended Tunnel ID
Sender (ingress) address
LSP ID According to RFC 3209, section 2.5, a traffic engineering (TE) TE tunnel is uniquely identified by the combination of: destination IP address (an address of the node which is the egress of the tunnel), a Tunnel ID, and the tunnel ingress node's IP address, which is placed in the Extended Tunnel ID field. During a reroute or bandwidth-increase operation, the tunnel ingress needs to appear as two different senders to the RSVP session. This is achieved by the inclusion of the field "LSP ID". Thus, a quadruple-key is used to identify a TE Tunnel and a quintuple-key is used to identify a LSP inside the TE Tunnel. Although reference is made throughout this specification to the quintuple-key, the invention does not exclude the possibility of a smaller set of identifiers, or a different set of identifiers, to identify a LSP.

If an LSP is controlled by the control plane then the MPLS-TE MIB 51 stores an entry describing the LSP at a network level because the node requires this information in order to properly manage the LSP. If an LSP is controlled by the management plane, it is not mandatory for the MPLS-TE MIB 51 to have an entry which describes the LSP at a network level, since the Network Management System (NMS) stores this information. Accordingly, it cannot be relied upon that a node will store, or be able to interpret, the quintuple-key of information which identifies a LSP.

Ownership of a LSP established via the management plane can be transferred to the control plane. Similarly, ownership of a LSP established via the control plane can be transferred to the management plane. Transfer of ownership can also be called "handover" or "adoption" and these terms will be used interchangeably.

Transfer of Ownership MP-CP

Figure 3:
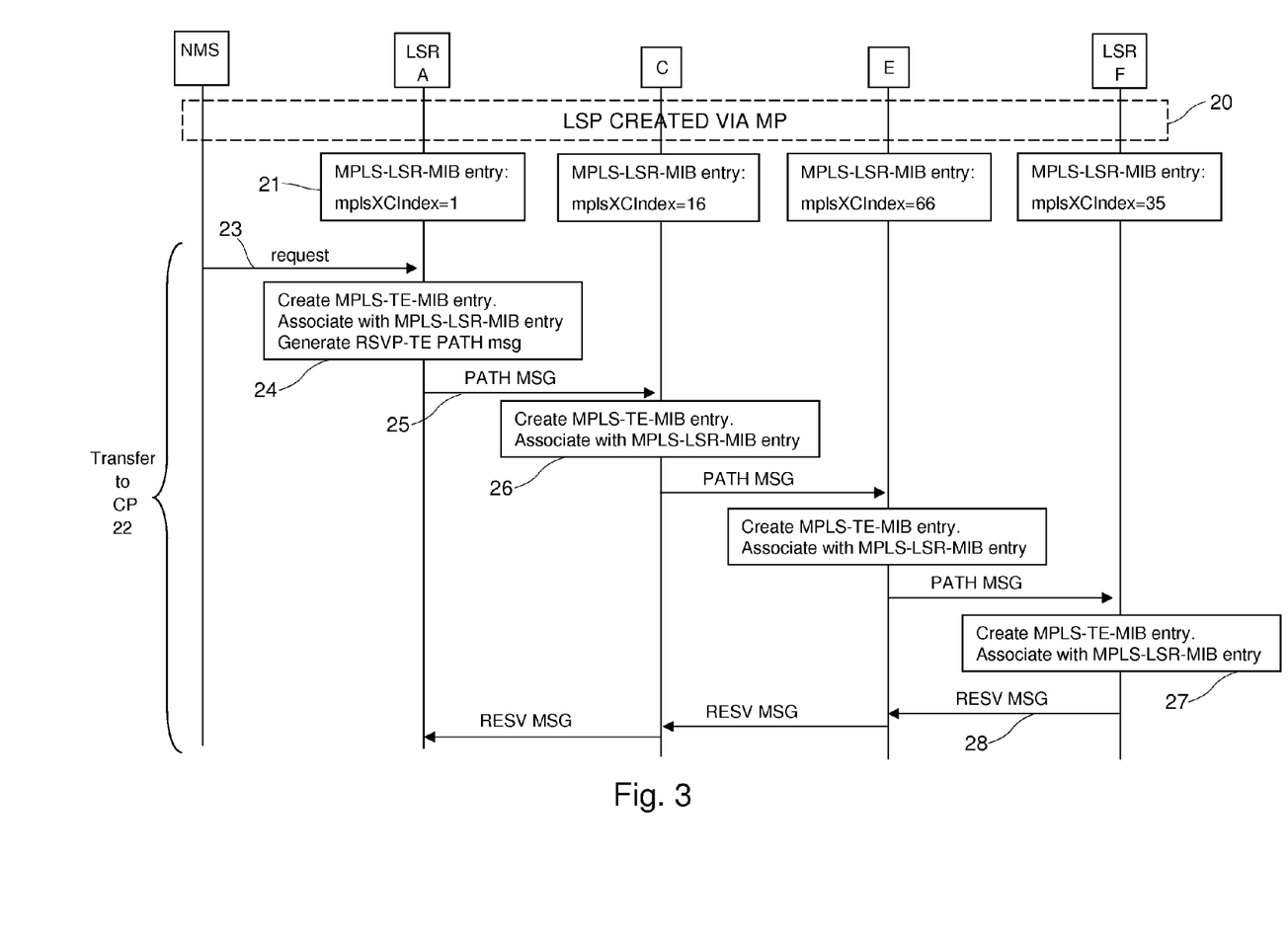
FIG. 3 shows an overview of signalling to perform a transfer of ownership of a LSP between the management plane and the control plane.

FIG. 3 shows an overall method of transferring ownership of a LSP which has been created via the MP. The LSP has the routing 12 shown in FIG. 1 of A-C-E-F. The LSP 12 is created via the NMS at step 20. The LSP is identified on the NMS by a quintuple of information:

Sender (ingress) address: A
Tunnel endpoint (egress) address: F
Tunnel ID: 100
Extended Tunnel ID: A
LSP ID: 1

Figure 4:
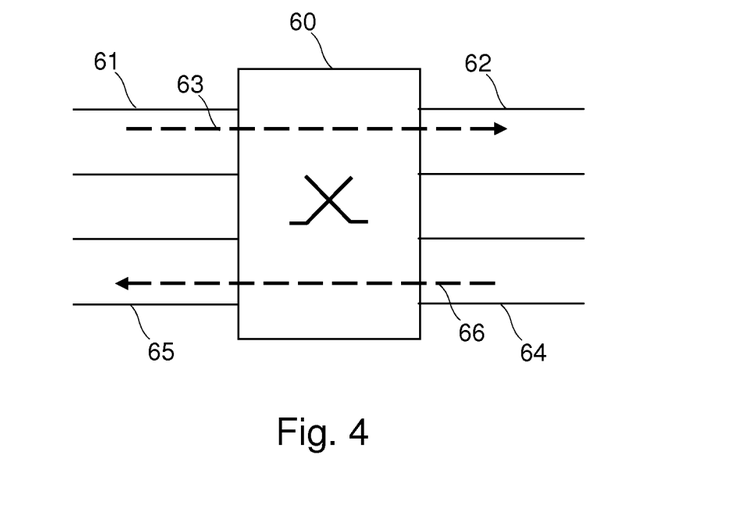
FIG. 4 shows a data plane cross-connection at a node.

The LSP crosses four nodes so the NMS sets up four cross-connections at the data plane level, one on each of nodes A, C, E and F. FIG. 4 shows a cross-connect function 60 at one of the nodes with segments (ports) 61, 62, 64, 65. A forward path 63 is shown connecting segments 61 and 62. A reverse path 66 is shown connecting segments 64 and 65. An entry is created in the MPLS-LSR MIB 52 of each node along the path. The entry provides the node with information required to forward transport units at the data plane. The entry includes data which specifies the ports of the node that are to be cross-connected and an identifier "mplsXCIndex" which identifies that cross-connection at the node. A fuller explanation of the entry is given later. Boxes 21 in FIG. 3 show the mplsXCIndex entry created in the MPLS-LSR-MIB at each node. The field mplsXCIndex identifies the cross-connection at the node level. Each LSP passing via a node has a unique value of the field mplsXCIndex at that node. MplsXCIndex values are re-used at nodes and so two different nodes may use the same value of mplsXCIndex to represent different LSPs.

Referring again to FIG. 3, the ownership transfer process is shown as a series of steps 22. Firstly, the NMS issues a request 23 to perform a transfer of ownership of an existing LSP in the network. This can also be called a request to transfer a Permanent Connection (PC) to a Soft Permanent Connection (SPC). The request 23 can be made using a protocol such as Simple Network Management Protocol (SNMP), CLI, NETCONF (RFC 4741) or HTTP. NMS provides the head node of the LSP 12 (LSR A) with the LSP information (e.g. quintuple) and a list of cross-connection identifiers used for that LSP. The list of cross-connection identifiers specifies each of the mplsXCIndex values used at nodes along the path 12. For the example LSP 12, this is the set of values: 1, 16, 66, 35.

Figure 5:
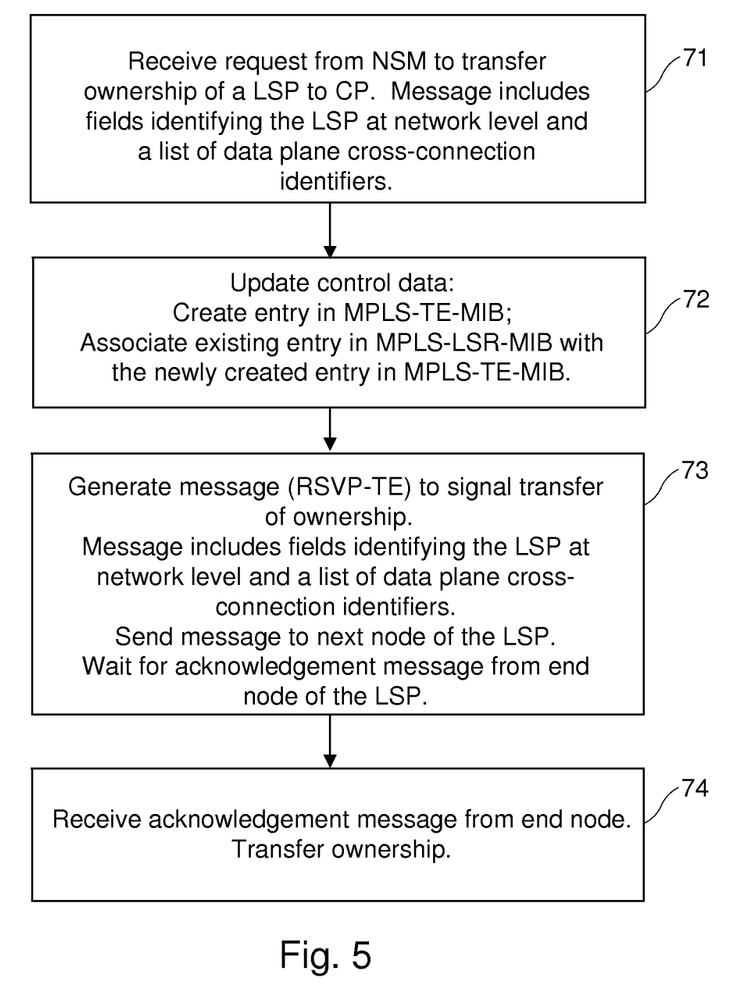
FIG. 5 shows steps performed at a head node of the LSP.

FIG. 5 shows steps performed at the head node A of the LSP. At step 71 a controller at LSR A receives the request for LSP adoption from the NMS. The controller processes the information within the message, correlating all the needed elements (e.g. LSP quintuple, list of cross-connection identifiers) and saves them. The way the information is stored in the equipment is implementation dependent, but information will be stored using the standard IETF Management Model, with data stored in MIBs. LSR A performs the following steps at step 72:

create an entry in MPLS-TE MIB;
associate the entry in the MPLS-TE MIB with the existing entry in the MPLS-LSR MIB which defines the cross-connection relating to that LSP.

At step 73 the controller requests the RSVP-TE module 56 to generate an RSVP-TE message which will be sent to nodes along the LSP to signal the transfer of ownership. LSP signalling procedures are described in RFC 2205, RFC 3209. The draft "RSVP-TE signalling Extension for the Conversion Between Permanent Connections and Soft Permanent Connections in a GMPLS Enabled Transport Network", 28 Oct. 2008 describes modifications to existing RSVP-TE signalling which allow a head node of an LSP to signal transfer of ownership. The RSVP-TE message is an RSVP-TE Path Message which has a flag, called a Handover flag, in the Administrative Status Object (RFC 3471, RFC 3473) indicating that transfer of ownership is to occur. The modified Path message also carries a list of cross-connection identifiers to allow the other nodes to identify the correct cross-connect identifier and hence LSP that is being transferred. The created RSVP-TE Path message is then sent to the next node (LSR C) at step 25 of FIG. 3.

Figure 6:
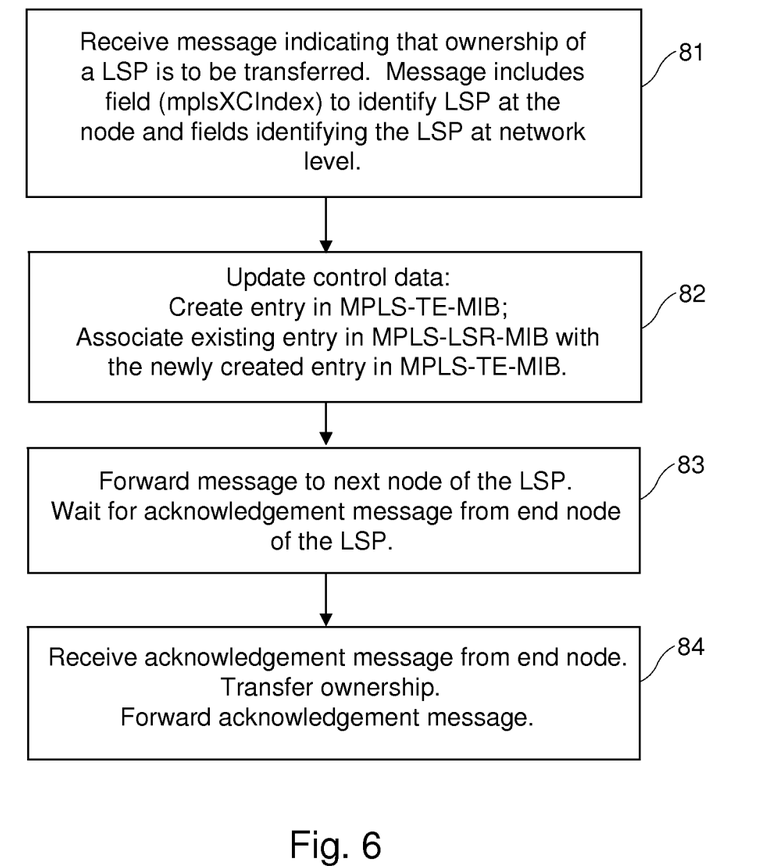
FIG. 6 shows steps performed at a node along the LSP.

FIG. 6 shows steps performed at node C along the path. At step 81 the node receives an RSVP-TE Path message and processes the message to retrieve an mplsXCIndex for that node. As described in more detail below, the received message contains a list of mplsXCIndex values as Explicit Route Object (ERO) subobjects. The message also includes information (the quintuple) identifying the LSP at network level. At step 82 the node creates an entry in the MPLS-TE MIB using the received quintuple and associates the newly created entry in the MPLS-TE MIB with the existing entry in the MPLS-LSR MIB which specifies the data plane cross-connection. Each node removes its entry from the list of ERO subobjects contained in the received Path message and inserts the new ERO, containing subobjects for the remaining nodes along the path, in the Path message for the next hop. This results in the final node along the Path receiving a message containing only the mplsXCIndex for that node as a subobject. At step 83 the Path message is sent to the next node along the LSP.

Figure 7:
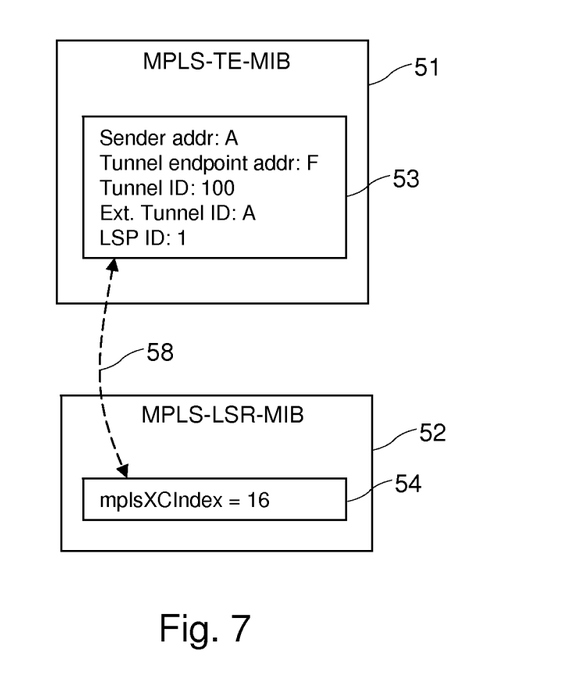
FIG. 7 shows an association between control data stored at a Label Switching Router.

FIG. 7 shows the two MIBs: MPLS-TE-MIB 51 and MPLS-LSR-MIB 52. An entry 53 in the MPLS-TE-MIB 51 identifies the LSP at the network level. An entry 54 in the MLPS-LSR-MIB 52 uniquely identifies the LSP at the node level by referring to the cross-connection that has been set up in the data plane. An association, or link, 58 is shown between the entries 53, 54 in the MIBs 51, 52.

Advantageously, the MPLS-LSR-MIB comprises a soft-state XC entry list and a static XC entry list. The soft-state XC entry list is a list of entries which are managed by RSVP-TE and are automatically deleted by the node if an RSVP-TE refresh timer expires. The static XC list is a list of entries which are stored until the node is instructed to remove an entry. Advantageously, the method updates the control data stored in the MPLS-LSR-MIB by moving the cross-connection identifier from the static XC entry list to the soft-state XC entry list.

The steps shown in FIG. 6 are repeated at nodes E and F along the path 12. Node F is the tail node for LSP 12. In addition to the steps described above, node F also sends back a RSVP-TE RESV message 28 in order to complete LSP signalling procedure. Each node along the path processes the RESV message and then forwards the RESV message to the next node along the path. FIG. 6, step 84, shows the method step performed at a node along the path. Receiving the acknowledgement message completes the transfer of ownership at the node. When the head node A receives the RESV message it processes it and the adoption procedure is completed.

It can be seen that in the MP-CP transfer, the NMS must provide the head node of the LSP with the list of cross-connections constituting the LSP, in order to let the Control Plane identify the MPLS-LSR-MIB entry (mplsXCIndex indexed) on each node. With this list of mplsXCIndexes, the control plane can adopt the LSP. Each node also needs the quintuple-key to create an entry in the MPLS-TE MIB (see point 2 above). Then this LSP will be identified in the network with the quintuple and its cross-connections with the mplsXCIndex list provided by NMS.

An advantageous embodiment of the signalling will now be described. The signalling will be called Explicit Cross Connection Control. An XC ERO (Explicit Route Object) subobject is defined to support Explicit Cross Connection Control.

XC ERO Subobject

The XC ERO subobject is defined as follows:

where:

L: 1 bit, this bit must be set to 0;

Type: 5 Label to be assigned by the Internet Assigned Numbers Authority (IANA);

Length: The Length field contains the total length of the subobject expressed in bytes, including the Type and Length fields. The Length is always divisible by 4. The L, Type and Length fields are defined in RFC3209 section 4.3.3.

The quintuple-key identifying the LSP at the network level is carried in the LSP_Tunnel_IPv4 Session Object and the LSP_TUNNEL_IPv4 Sender Template Object. RFC 3209 defines these in sections 4.6.1 and 4.6.2 as follows:

4.6.1. Session Object 4.6.1.1. LSP_TUNNEL_IPv4 Session Object

Class=SESSION, LSP_TUNNEL_IPv4 C-Type=7

4.6.2. Sender Template Object 4.6.2.1. LSP_TUNNEL_IPv4 Sender Template Object

Class=SENDER_TEMPLATE, LSP_TUNNEL_IPv4 C-Type=7

Transfer of Ownership CP-MP

Figure 8:
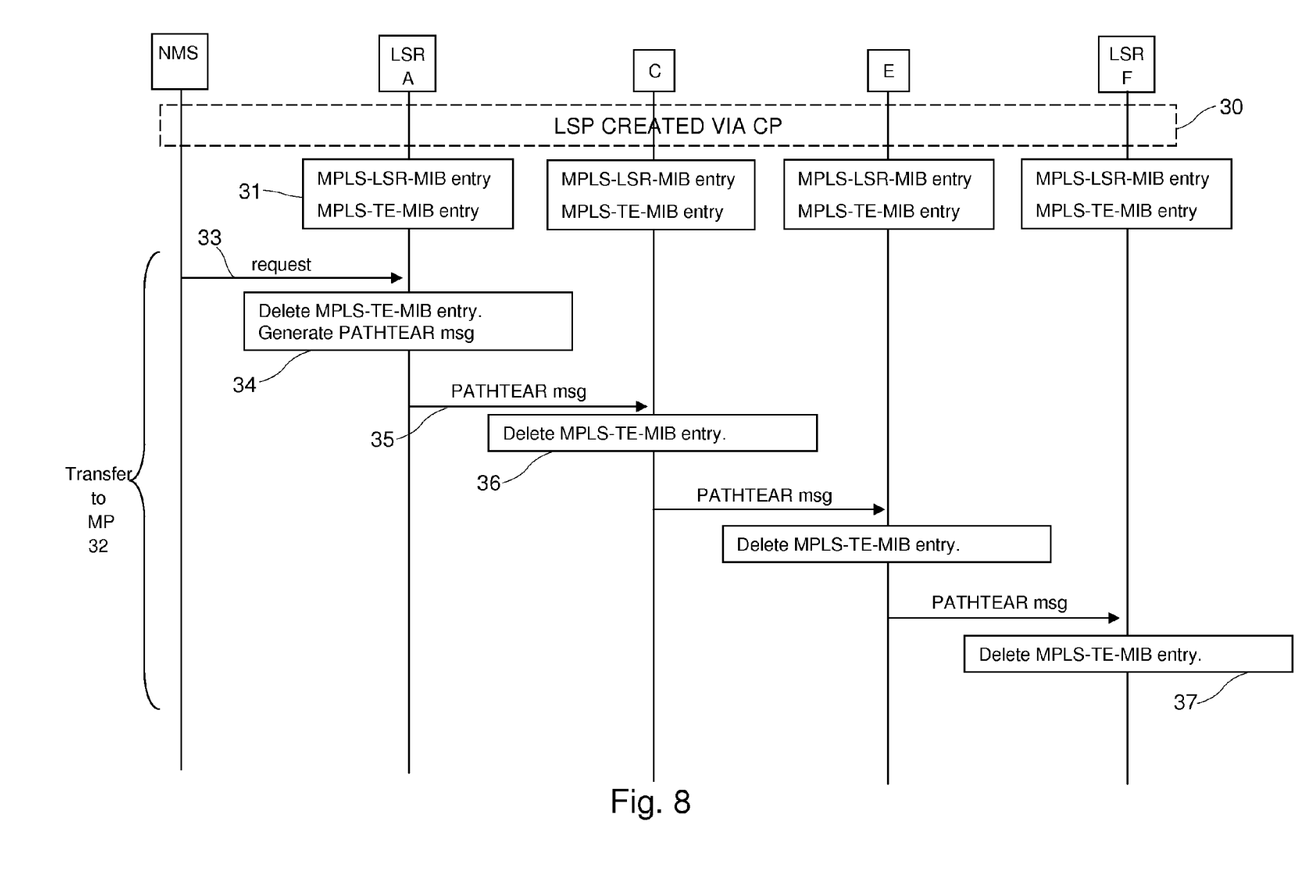
FIG. 8 shows an overview of signalling to perform a transfer of ownership of a LSP between the control plane and the management plane.

FIG. 8 shows an overall method of transferring ownership of a LSP which has been created via the CP. The LSP has the same routing 12 shown in FIG. 1, starting at node A and routed via nodes C, E and F. The LSP 12 is created via the NMS at step 20. The LSP is identified on the NMS by the same quintuple of information:

Sender (ingress) address: A
Tunnel endpoint (egress) address: F
Tunnel ID: 100
Extended Tunnel ID: A
LSP ID: 1

In order to adopt LSP 12, NMS 15 sends a request to the head node (LSR A) to perform a transfer of ownership of an existing LSP in the network. This can also be called a request to transfer a Soft Permanent Connection (SPC) to a Permanent Connection (PC). The request identifies the LSP by an LSP identifier (i.e. quintuple). As a preliminary step the NMS may first retrieve the quintuple-key identifying the LSP from the head node.

Figure 9:
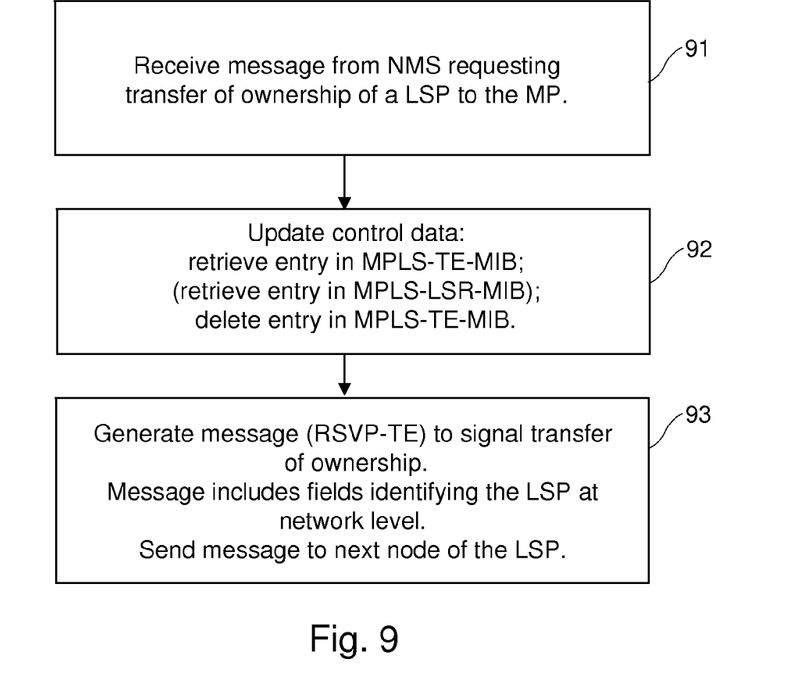
FIG. 9 shows steps performed at a head node of the LSP.

FIG. 9 shows steps performed at the head node A of the LSP. At step 91 the head node A receives the request to transfer ownership of the LSP. At step 92 the controller updates control data stored at the node. This comprises:

retrieving the entry in the MPLS-LSR-MIB associated with the MPLS-TE MIB entry;

removing the association between the MPLS-TE MIB entry and the MPLS-LSR MIB entry;

deleting the MPLS-TE MIB entry.

At step 93 the controller requests the RSVP-TE module 56 to generate an RSVP-TE message which will be sent to nodes along the LSP to signal the transfer of ownership. An RSVP-TE Path Tear Message can be used.

Figure 10:
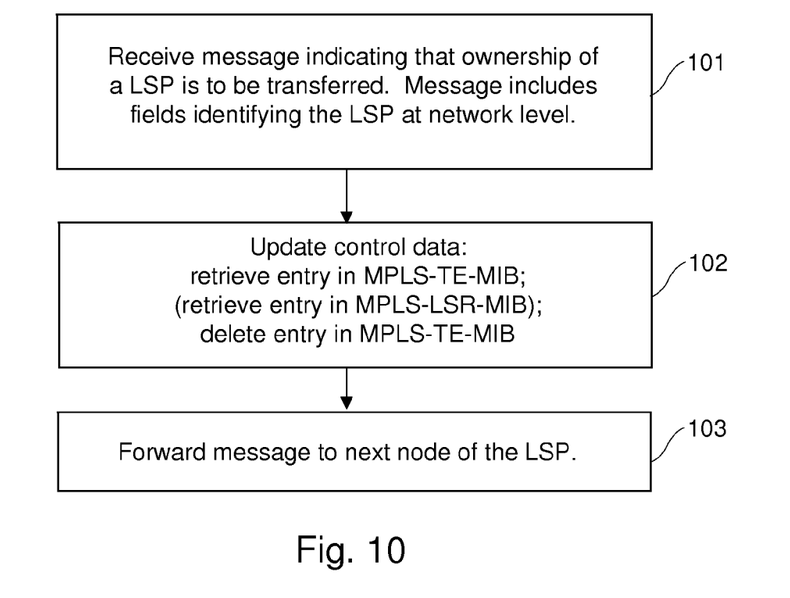
FIG. 10 shows steps performed at a node along the LSP.

FIG. 10 shows steps performed at node C along the path. At step 101 the node receives the Path Tear Message. The Path Tear message indicates that there is to be a transfer of ownership of a LSP. The LSP that is to be transferred is identified at the network level by the LSP identifier (LSP quintuple). At step 102 control data at the node is updated. This comprises:

retrieving the entry in the MPLS-TE MIB using the quintuple signalled by RSVP-TE;

retrieving the entry in the MPLS-LSR-MIB associated with the MPLS-TE MIB entry. Advantageously, the MPLS-LSR-MIB comprises a soft-state XC entry list and a static XC entry list. The soft-state XC entry list is a list of entries which are managed by RSVP-TE and are automatically deleted by the node if an RSVP-TE refresh timer expires. The static XC list is a list of entries which are stored until the node is instructed to remove an entry. Advantageously, this step of the method changes ownership of the entry, moving from the soft-state XC entry list to the static XC entry list;

deleting the MPLS-TE MIB entry.

The final step of deleting the MPLS-TE MIB entry is optional. At step 103 the node sends a Path Tear Message to the next node along the path.

The steps shown in FIG. 10 are repeated at nodes E and F along the path 12. Node F is the tail node for LSP 12. When the tail node receives the Path Tear Message, and has performed the steps of FIG. 10, the adoption procedure is complete.

It can be seen that for CP-MP transfer the NMS does not need to provide the control plane with the list of cross-connections, but only the LSP identifier (LSP quintuple). The Control Plane does not need the set of mplsXCIndexes because it is able to retrieve this information by itself (because MPLS-TE-MIB entry points to MPLS-LSR-MIB entry).

During transfer of ownership of a LSP, the data plane forwarding behaviour is unaffected to avoid any disruption to traffic.

In the embodiments described above a list of cross-connection identifiers for a LSP is supplied by the NMS. In an alternative embodiment information can be collected by sending a signaling message along the LSP. This procedure is known as route recording. An RRO (Record Route Object) subobject is defined to support Explicit Cross Connection Control.

XC RRO Subobject

The XC RRO subobject is defined as follows:

include a XC RRO subobject. The RRO subobject is pushed onto the RECORD_ROUTE object prior to pushing on the node's IP address. Advantageously, a node must not push on a RRO subobject without also pushing on an IPv4 or IPv6 subobject.

In the embodiments described modified RSVP-TE signalling is used to signal transfer of ownership. Other signalling messages, and protocols, can be used in place of RSVP-TE.

The cross-connection operation, and control data relating to cross-connection, will now be described in more detail. In a GMPLS network the MPLS-LSR-MIB 52 comprises a set of tables:

an interface table (mplsInterfaceTable), which is used for revealing the MPLS protocol on MPLS-capable interfaces;

in-segment (mplsInSegmentTable) and out-segment (mplsOutSegmentTable) tables which are used for configuring LSP segments at an LSR;

a cross-connect table (mplsXCTable) which is used to associate in and out segments together, in order to form a cross-connect;

a label stack table (mplsLabelStackTable) which is used for specifying label stack operations.

The mplsXCTable will be described in more detail. This table can support any kind of LSP: point-to-point (p2p), point-to-multipoint (p2mp) and multipoint-to-point (mp2p) and includes the entries required to associate segments belonging to the same LSP together. Its main functionality is to instruct the LSR to switch between related segments. The mplsXCTable is uniquely defined by three keys: mplsXCIndex, mplsXCInSegmentIndex, mplsXCOutSegmentIndex. The following worked example describes LSP creation on an LSR using the set of tables described above. This example creates a bidirectional LSP entering the LSR through MPLS interface A with ifIndex 12 and leaving through interface B with ifIndex 13 for the downstream direction and from B to A for the upstream direction.

The first step updates the gmplsLabelTable with the rows corresponding to the four segments created: in-forward, in-

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |            Reserved           |
+-+-+-+-+-+-+-+-+-+-+-+-+-+-+-+-+-+-+-+-+-+-+-+-+-+-+-+-+-+-+-+-+
|                           mplsXCindex                          |
+-+-+-+-+-+-+-+-+-+-+-+-+-+-+-+-+-+-+-+-+-+-+-+-+-+-+-+-+-+-+-+-+
``` where:

Type: 5 Label to be assigned by IANA;

Length: the Length contains the total length of the subobject in bytes, including the Type and Length fields. The Length is always divisible by 4.

A new flag (XC_Recording flag) is also defined. This indicates that XC information should be included when performing a route record. The LSP_ATTRIBUTES object defined in [RFC4420] is used on Path messages to convey the XC_Recording Flag. One bit is defined for inclusion in the Attribute Flags TLV. The bit number will be assigned by IANA. Legacy RRO processing applies as per Section 4.4.

The procedures to XC record is similar the label record procedure described in RFC 3209 section 4.3 and RFC 3473 section 5. When the XC_Recording flag is set in the LSP_ATTRIBUTES object, nodes performing route recording should reverse, out-forward, out-reverse. The number of rows is reduced to two (one for each interface) if the forward and reverse label on each interface are the same.

```
In gmplsLabelTable:
    {
        gmplsLabelInterface    = 12,
        gmplsLabelIndex        = 1,
        gmplsLabelSubindex     = 0,
        gmplsLabelType         = gmplsFreeformLabel(3),
        gmplsLabelFreeform     = 0x123456789ABCDEF0
        gmplsLabelRowStatus    = createAndGo(4)
    }

In gmplsLabelTable:
    {
        gmplsLabelInterface    = 13,
        gmplsLabelIndex        = 1,
        gmplsLabelSubindex     = 0,
```

```
    gmplsLabelType          = gmplsFreeformLabel(3),
    gmplsLabelFreeform      = 0xFEDCBA9876543210
    gmplsLabelRowStatus     = createAndGo(4)
}
```

Then the in-segment and out-segment entries must be created using the mplsInSegmentTable and mplsOutSegmentTable. In these tables the labels are not explicitly inserted but a row pointer to the two rows of the gmplsLabelTable table are used. The tables for the forward direction are the following:

```
In mplsInSegmentTable:
{
    mplsInSegmentIndex       = 0x00000015
    vmplsInSegmentLabel      = 0, -- incoming label in label table
    mplsInSegmentNPop        = 1,
    mplsInSegmentInterface   = 12, -- incoming interface
    -- RowPointer MUST point to the first accessible column.
    mplsInSegmentTrafficParamPtr = 0.0,
    mplsInSegmentLabelPtr    = gmplsLabelTable(12,1,0)
    mplsInSegmentRowStatus   = createAndWait(5)
}
In mplsOutSegmentTable:
{
    mplsOutSegmentIndex      = 0x00000012,
    mplsOutSegmentInterface  = 13, -- outgoing interface
    mplsOutSegmentPushTopLabel = true(1),
    mplsOut SegmentTopLabel  = 0, -- outgoing label in label table
    -- RowPointer MUST point to the first accessible column.
    mplsOutSegmentTrafficParamPtr = 0.0,
    mplsOutSegmentLabelPtr   = gmplsLabelTable(13,1,0)
    mplsOutSegmentRowStatus  = createAndWait(5)
}
```

While the ones for the reverse direction are hereinafter:

```
In mplsInSegmentTable:
{
    mplsInSegmentIndex       = 0x00000016
    mplsInSegmentLabel       = 0, -- incoming label in label table
    mplsInSegmentNPop        = 1,
    mplsInSegmentInterface   = 13, -- incoming interface
    -- RowPointer MUST point to the first accessible column.
    mplsInSegmentTrafficParamPtr = 0.0,
    mplsInSegmentLabelPtr    = gmplsLabelTable(13,1,0)
    mplsInSegmentRowStatus   = createAndWait(5)
}
In mplsOutSegmentTable:
{
    mplsOutSegmentIndex      = 0x00000013,
    mplsOutSegmentInterface  = 12, -- outgoing interface
    mplsOutSegmentPushTopLabel = true(1),
    mplsOutSegmentTopLabel   = 0, -- outgoing label in label table
    -- RowPointer MUST point to the first accessible column.
    mplsOutSegmentTrafficParamPtr = 0.0,
    mplsOutSegmentLabelPtr   = gmplsLabelTable(12,1,0)
    mplsOutSegmentRowStatus  = createAndWait(5)
}
```

Then two cross-connect entries are created in the mplsXCTable and the four segments are associated together.

```
In mplsXCTable:
}
    mplsXCIndex              = 0x01,
    mplsXCInSegmentIndex     = 0x00000015,
    mplsXCOutSegmentIndex    = 0x00000012,
    mplsXCLspId              = 0x0102
    mplsXCLabelStackIndex    = 0x00, outgoing label
    mplsXCRowStatus          = createAndGo(4)
}
In mplsXCTable:
{
    mplsXCIndex              = 0x01,
    mplsXCInSegmentIndex     = 0x00000016,
    mplsXCOutSegmentIndex    = 0x00000013,
    mplsXCLspId              = 0x0102
    mplsXCLabelStackIndex    = 0x00, outgoing label
    mplsXCRowStatus          = createAndGo(4)
```

The four segments of a bidirectional LSP can be recognised as being part of the same LSP if the mplsXCIndex for both of the directions is the same. This property is used to uniquely identify a LSP at each node.

The invention is not limited to the embodiments described herein, which may be modified or varied without departing from the scope of the invention.

The invention claimed is:

1. A method of configuring a change in control of a label switched path established at a node of a network, the change in control being from a management plane to a control plane of the network, the node storing control data, the method comprising the steps of:
   receiving a message indicating a change in control of the label switched path, the message identifying the label switched path by a cross-connection identifier corresponding to an entry in the control data stored at the node which identifies data plane ingress and egress segments cross-connected at the node; and
   updating control data at the node based on the identified label switched path, wherein the control data stored at the node comprises a first management information base which is used by the data plane and a second management information base which is used by the control plane, and wherein the updating comprises,
   creating an entry in the second management information base;
   associating the entry in the second management information base with an entry in the first management information base which identifies data plane ingress and egress segments cross-connected at the node.

2. The method according to claim 1 wherein the received message includes information identifying the label switched path at a network level, and the step of creating the entry in the second management information base uses the information identifying the label switched path at the network level.

3. The method according to claim 2 wherein the information identifying the label switched path at the network level comprises at least one of: a Tunnel endpoint (egress) address; a Tunnel identifier; an Extended Tunnel identifier; a Sender (ingress) address; and a label switched path identifier.

4. The method according to claim 1 wherein the second management information base is a Multiprotocol Label Switching Traffic Engineering management information base (MPLS-TE-MIB).

5. The method according to claim 1 wherein the first management information base is a Multiprotocol Label Switching Label Switching Router management information base.

6. The method according to claim 1 wherein the cross-connection identifier is a table entry key.

7. The method according to claim 1 wherein the message received at the node contains a cross-connection identifier for at least each of a set of remaining nodes along the label switched path and the method comprises extracting the cross-connection identifier for the node.

8. The method according to claim 1 wherein the message comprises a Resource Reservation Protocol-Traffic Engineering (RSVP-TE) message with a flag indicating that ownership is being transferred.

9. A method of configuring a change in control of a label switched path established between a set of one or more nodes of a network between a head node and a tail node, the change in control being from a management plane to a control plane of the network, wherein a plurality of nodes along the path store control data, the method performed by the head node and comprising the steps of:
receiving a first message requesting a change in control of the label switched path, the message including a first plurality of cross-connection identifiers for each of the one or more nodes along the label switched path;
generating a second message indicating a change in control of the label switched path, the message identifying the label switched path by a second plurality of cross-connection identifiers, each cross-connection identifier corresponding to an entry in a control data stored at a node along the path which identifies data plane ingress and egress segments cross-connected at that node;
sending the second message to a next node along the label switched path; and
updating control data at the node based on the identified label switched path, wherein the control data stored at the node comprises a first management information base which is used by the data plane and a second management information base which is used by the control plane, and wherein the updating comprises,
creating an entry in the second management information base;
associating the entry in the second management information base with an entry in the first management information base which identifies data plane ingress and egress segments cross-connected at the node.

10. A network node for use in a label switching network comprising:
an input for connecting to the network;
an output for connecting to the network;
a store for storing control data comprising an entry which identifies data plane ingress and egress segments cross-connected at the node; and
a controller which is configured to:
perform label switching to implement a label switched path via the node,
receive a message indicating a change in control of the label switched path from a management plane to a control plane of the network, the message identifying the label switched path by a cross-connection identifier corresponding to the entry in the control data stored at the node, and
update the control data based on the identified label switched path, wherein the control data stored at the network node comprises a first management information base which is used by the data plane and a second management information base which is used by the control plane, and wherein the update comprises operations to,
create an entry in the second management information base;
associate the entry in the second management information base with an entry in the first management information base which identifies data plane ingress and egress segments cross-connected at the node.

11. A network node for use in a label switching network comprising:
an input for connecting to the network;
an output for connecting to the network;
a controller which is configured to:
receive a first message requesting a change in control of a label switched path established in the network from a management plane to a control plane, the message including a first plurality of cross-connection identifiers for each of the one or more nodes along the label switched path,
generate a second message indicating a change in control of the label switched path, the message identifying the label switched path by a second plurality of cross-connection identifiers, each cross-connection identifier corresponding to an entry in a control data stored at a node along the path which identifies data plane ingress and egress segments cross-connected at that node,
send the second message to a next node along the label switched path, and
update control data at the node based on the identified label switched path, wherein the control data stored at the node comprises a first management information base which is used by the data plane and a second management information base which is used by the control plane, and wherein the update operates to,
create an entry in the second management information base;
associate the entry in the second management information base with an entry in the first management information base which identifies data plane ingress and egress segments cross-connected at the node.

12. A method of configuring a change in control of a label switched path established at a node of a network, the change in control being from a control plane to a management plane of the network, the node storing control data comprising a first management information base which is used by the data plane and a second management information base which is used by the control plane, the method comprising at the node:
receiving a message from a previous node in the label switched path indicating a change in control of the label switched path, the message identifying the label switched path using information which corresponds to an entry in the second management information base;
using the entry in the second management information base to retrieve an entry in the first management information base, the entry in the first management information base comprising a cross-connection identifier which identifies data plane ingress and egress segments cross-connected at the node;
updating control data at the node using the identified label switched path in the message, wherein the updating finishes the change in control at that node, wherein the updating comprises deleting the entry in the second management information base; and
sending a message indicating that there is to be a transfer of ownership of the label switched path to a next node along the path.

13. A network node for use in a label switching network comprising:
an input for connecting to the network;
an output for connecting to the network;

a store for storing control data comprising a first management information base which is used by the data plane and a second management information base which is used by the control plane; and a controller which is arranged to:

perform label switching to implement a label switched path via the node, receive a message from an previous node in the label switched path indicating a change in control of the label switched path from the control plane to a management plane, the message identifying the label switched path using information which corresponds to an entry in the second management information base, use the entry in the second management information base to retrieve an entry in the first management information base, the entry in the first management information base comprising a cross-connection identifier which identifies data plane ingress and egress segments cross-connected at the node, update control data at the node using the identified label switched path in the message, wherein the update of the control data finishes the change in control at that node, wherein the update operates to delete the entry in the second management information base; and send a message indicating that there is to be a transfer of ownership of the label switched path to a next node along the path.

* * * * *